United States Patent [19]

Nagasawa et al.

[11] Patent Number: 4,584,684
[45] Date of Patent: Apr. 22, 1986

[54] DATA TRANSMISSION METHOD

[75] Inventors: Kunihiko Nagasawa; Isao Nishibori, both of Tokyo, Japan

[73] Assignee: Pioneer Electronic Corp., Tokyo, Japan

[21] Appl. No.: 554,486

[22] Filed: Nov. 22, 1983

[30] Foreign Application Priority Data

Nov. 25, 1982 [JP] Japan .............................. 57-206757

[51] Int. Cl.⁴ .......................................... G06F 11/00
[52] U.S. Cl. .................................... 371/33; 364/200
[58] Field of Search ................. 371/33, 49, 32, 31, 371/30, 157, 61, 62; 364/200, 900; 178/23 A, 2 E

[56] References Cited

U.S. PATENT DOCUMENTS

| | | | |
|---|---|---|---|
| 3,676,846 | 7/1972 | Busch | 371/33 |
| 3,754,211 | 8/1973 | Rocher et al. | 371/33 |
| 4,082,922 | 4/1978 | Chu | 371/33 |
| 4,332,027 | 5/1982 | Malcolm | 371/33 |
| 4,352,183 | 9/1982 | Davis | 371/33 |
| 4,358,825 | 11/1982 | Kyu | 364/200 |
| 4,451,884 | 5/1984 | Health | 364/200 |
| 4,451,886 | 5/1984 | Guest | 364/200 |
| 4,471,425 | 9/1984 | Yameguchi et al. | 364/200 |
| 4,511,958 | 4/1985 | Funk | 371/33 |

Primary Examiner—Michael R. Fleming
Attorney, Agent, or Firm—Sughrue, Mion, Zinn, Macpeak & Seas

[57] ABSTRACT

A data transmission method in which a signal receiving side produces a response code for requesting a text in response to a start request made by a signal transmitting side, and produces an acknowledgement code or a text invalid code upon receiving the requested text, dependent upon the validity of the transmission. A standby request signal is set to the signal transmitting side in response to the start request if the receiving side is not ready. The receiving side, when ready, send a transmission request signal to the signal transmitting side for requesting transmission of text. When a first transmission request signal is received following receipt of a start request code, a timer is started at the transmitting side and the text is transmitted. The receiving side can send additional transmission requests, in which case the text is retransmitted without restarting the clock. Unless the transmission of a text has been completed successfully and an acknowledgement signal received from the receiving side before the timer runs out, the transmission of the text is suspended or invalidated.

4 Claims, 19 Drawing Figures (TRS): TEXT RECEPTION SIDE
(TTS): TEXT TRANSMISSION SIDE

ACCOMPLISHED

ACCOMPLISHED

ACCOMPLISHED

NOT ACCOMPLISHED

NOT ACCOMPLISHED

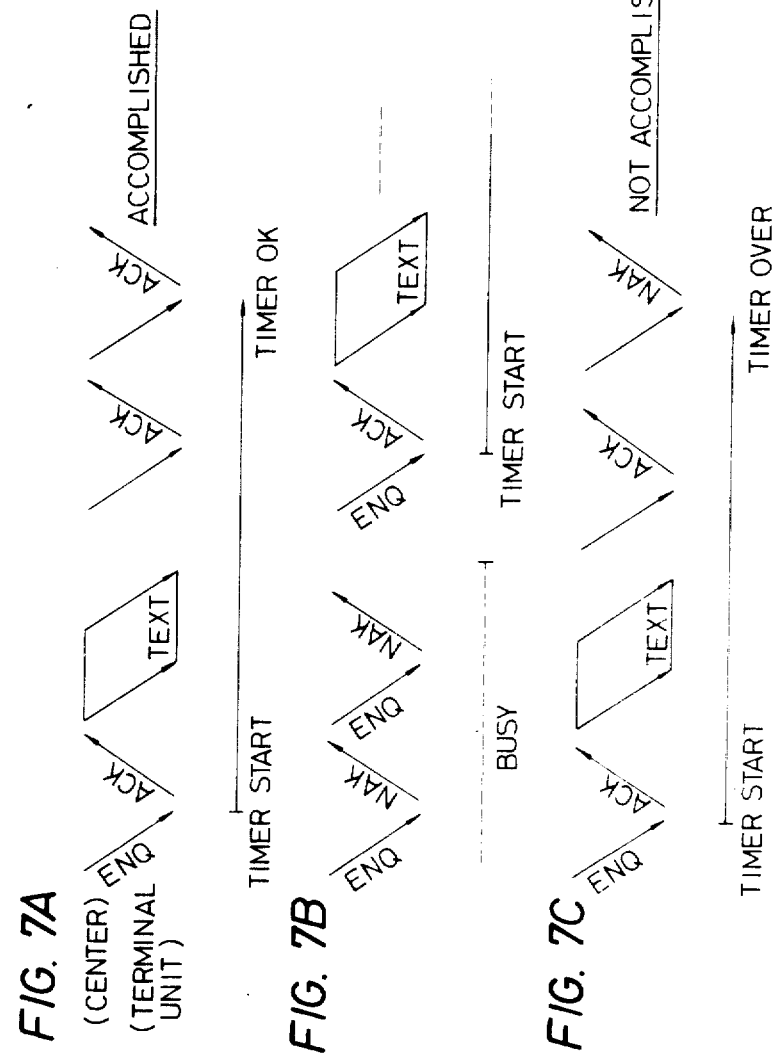

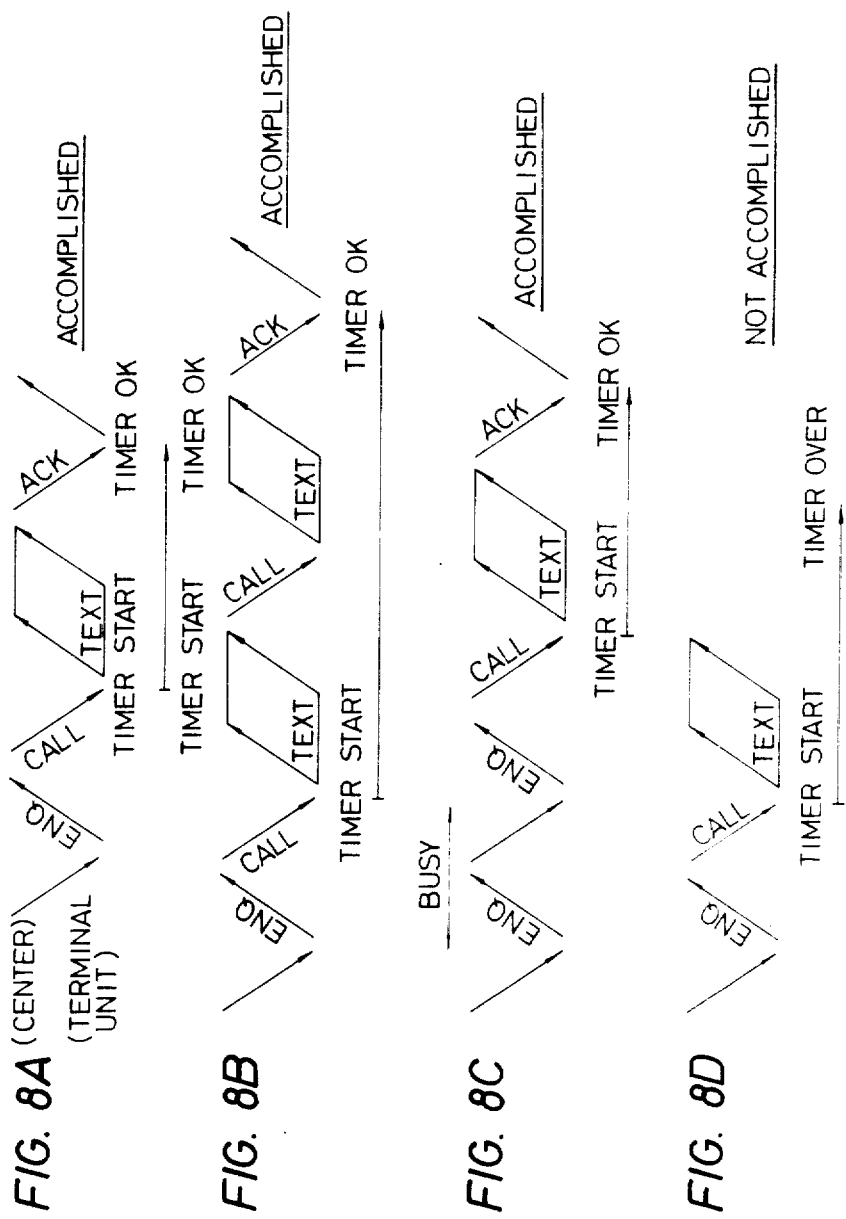

DATA TRANSMISSION METHOD

BACKGROUND OF THE INVENTION

The present invention relates to a signal concentration type data transmission system or the like.

In a terminal start type data transmission system, just as on the signal receiving side, the signal transmitting side must have the capacity for enabling a retransmission request when an error is detected in a received signal control code such as a response code (ENQ: enquiry) for a start request, a text acknowledgement code (ACK: acknowledgement), or a text negative acknowledgement code (NAK: negative acknowledgement). For reasons which will become apparent, in order to efficiently transmit a text, it is necessary to count how many times the retransmission request has been made.

A data transmission system of the type to which the invention relates is shown in block diagram form in FIG. 1. In this system, a data memory section 1 stores variable data and fixed data (hereinafter referred to as a "text" when applicable) to be transmitted to a terminal on the signal receiving side, namely, a master station such as a CPU. The data memory section 1 is connected to a transmitter 2. The transmitter 2 operates to convert parallel data outputted by the data memory section 1 into serial data and to transmit the text over a data channel.

The system further includes a receiver 3 which converts serial data received over the data channel into parallel data so that it can be read by the terminal and which also detects parity errors in various control codes. The output of the receiver 3 is connected to a comparison circuit section 4. The comparison circuit section 4 performs comparing operations on codes (control characters) received from the CPU via the receiver 3 with control characters from the data memory section 1, and applies an operation state signal representing the results of the comparison to a control section 5.

The control section 5 instructs the operations of the circuit elements and monitors the conditions of them, and controls a timer 6 and an error counter 7. The timer 6 is used for monitoring the time of data transmission between the CPU and the terminal on the signal transmission side, and the error counter 7 operates to count errors detected at various time instants during data transmission. The timer 6 and the error counter 7 supply state signals representing their states to the control section 5.

Data transmission from the described terminal is carried out as follows. When the signal transmitting side has data to be transmitted to the CPU, the data memory section 1 assembles a text, including a parity bit, and passes it to the transmitter 2 from which it is transmitted over the data channel. At the time of transmission, the timer 6 is set so that the receiver is made ready for receiving the data. If the data is not received by the receiver within the period of time set by the timer 6, then a stepping operation is performed by the error counter 7. Specifically, the content of the error counter 7 is increased by one and the text is transmitted again. When the content of the error counter 7 exceeds a predetermined value (usually three), it is determined that the data cannot be transmitted.

FIG. 2A shows what is present on the data channel in a conventional data transmission system. When the terminal on the text transmitting side is to transmit data, a start request ENQ is sent to the CPU to determine whether the data can be received or not. When the CPU is ready for receiving the data, the signal receiving side sends a response code ENQ to the signal transmitting side to initiate transmission of the text. As a result, the terminal on the signal transmitting side performs the transmission of the text. When the signal receiving side has correctly received the text, this fact is communicated to the signal transmitting side by sending a text acknowledgement code ACK. Thus, the signal transmitting side confirms that the data transmitting operation has been correctly carried out and the data transmission accomplished in the period of time set by the timer.

In the case where, as shown in FIG. 2B, it is detected that a response code from the signal receiving side or a transmitted text includes an error (the signal receiving side sending a text negative acknowledgement code NAK), the signal transmitting side transmits the start ENQ again or transmits the text again. The numbers of these operations are counted by the error counter 7. In the case when, although the content of the counter has reached the predetermined value, no response code ENQ or text acknowledgement code ACK is received, transmission is ended. In the case where, although the signal transmitting side has transmitted a start request ENQ, no response is made to the signal transmitting side (as shown in the FIG. 2C), the start request is transmitted at intervals corresponding to the period of time set by the timer 6.

The transmission of the start request can be carried out three times. If the number of times of transmission of the start request exceeds three, then it is determined that an error is involved, and the transmission procedure is commenced again. When the text acknowledgement code ACK is transmitted to the signal transmitting side, the comparison circuit section 4 detects whether or not it is an effective character, and the code is returned as an acknowledgement code ACK to the signal receiving side, as indicated by the pattern of FIG. 2A.

In the conventional data transmission system described above, if data transmission is carried out as indicated by the pattern of FIG. 2A, there is no problem. However, in the case where, as shown in FIG. 2B, a start request or text from the signal transmitting side contains an error and the negative acknowledgement code NAK is used for retransmission, the signal transmitting side performs similarly to the terminal on the signal receiving side, responding a predetermined number of times.

Accordingly, a signal concentration type data transmission system in which a single CPU is employed as a terminal on the signal receiving side and a plurality of terminal units on the signal transmitting side are connected to the CPU, the signal transmitting side requires an error counter and complex circuitry used in association with the error counter. In addition, during the operation of the counter 7, the response of ACK/NAK is continuously carried out. This is not efficient, increasing the overall transmission time. Furthermore, since the signal transmitting side transmits signals continuously, the CPU may be placed in a communication "panic" state.

An object of the invention is thus to eliminate the above-described drawbacks accompanying a conventional data transmission system. More specifically, an object of the invention is to provide a data transmission method in which a terminal on the signal transmitting side has a simple construction and with which transmission can be controlled mainly by a central terminal on the signal receiving side, and whereby, even in view of the simplified transmitting terminal construction, the transmission efficiency is improved and data is transmitted and received effectively and economically.

SUMMARY OF THE INVENTION

The foregoing object and other objects of the invention have been achieved by the provision of a data transmission method according to which the signal receiving side produces a response code for requesting a text in response to a start request made by the signal transmitting side, and produces a text valid code or a text invalid code for the received text. According to the invention, the signal receiving side has means for transmitting a standby request signal to the signal transmitting side in response to the start request, and means for transmitting a retransmission request signal to the signal transmitting side for requesting the retransmission of a text, and the signal transmitting side has means for operating a timer upon reception of a response signal from the signal receiving side and for automatically suspending, when communication is not finished within a predetermined period of time, the communication operation.

BRIEF DESCRIPTION OF THE DRAWINGS

FIGS. 7A through 7C are timing charts showing signal transmission patterns in the case where data is transmitted from the center to a terminal unit; and FIGS. 8A through 8D are timing charts showing signal transmission patterns in the case where data is transmitted from the terminal unit to the center.

DESCRIPTION OF THE PREFERRED EMBODIMENTS

A preferred embodiment of the invention will now be described with reference to FIGS. 3 through 8. The data transmission system according to the invention is applied to a two-way CATV system having one concentration center 8 (FIG. 4) and a plurality of terminal units 9 connected to the center 8 as shown in FIG. 4. The center 8 carries out two-way data communications with the terminal units 9 according to a polling selection system.

Figure 5:
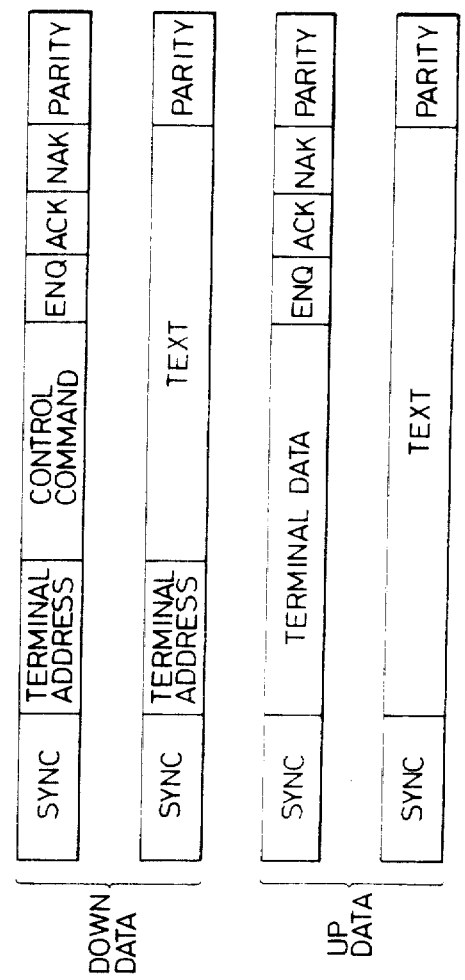
FIG. 5 is an explanatory diagram showing the contents of data determined in accordance with the invention.

The data patterns used in this system are shown in FIG. 5. The down data is composed of synchronization (SYNC) data, terminal address data, control commands (including a call command), text data, an ENQ bit, an ACK bit, an NAK bit and a parity check segment. The up data is composed of synchronization (SYNC) data, terminal data (including text), an ENQ bit, an ACK bit, an NAk bit and a parity check segment. For ordinarily polling, the down command call is not used, and the ACK, NAK and ENQ bits are "0". In the up data also, the ACK, NAK and ENQ bits are set at "0".

Figure 6:
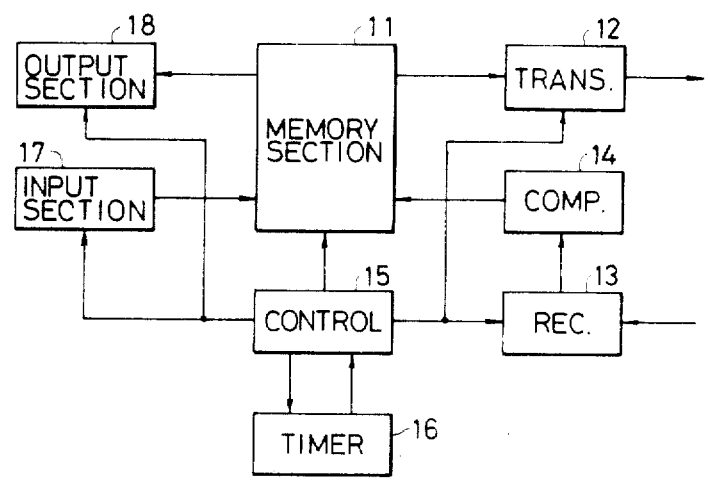
FIG. 6 is a block diagram showing the arrangement of a terminal unit in the invention.

In the terminal unit, as shown in FIG. 6, a memory section 11 operates to store data through communication with the center. The memory section 11 is connected to a transmitter section 12 and a receiver section 13. The transmitter section 12 converts parallel data provided by the memory section 11 into serial data at a predetermined rate and applies the up data to a data channel connected thereto. The receiver section 13 converts serial data received via the data channel into parallel data in a form readable by the terminal.

A control section 15 instructs the operations of the circuit elements and monitors the conditions of them. The control section 15 applies start, stop and clear instructions to a timer section 16. The timer section 16 supplies a time-is-up signal to the control section 15. An input section 17 applies signals from an input keyboard and various sensors to the control section 15. The control section 15 applies data such as character display data and TV tuning data to an output section 18. A comparison circuit 14 compares return signal codes (control character) from the center with control characters in the memory section 11 and supplies a signal representative of the comparison results to the control section 15.

FIGS. 3A through 3E are explanatory diagrams showing the functions of a data transmitting system of the invention, generally indicating the operations at the text receiving side TRS and text transmitting side TTS. In FIGS. 3A through 3E, reference character ENQ designates a transmitting side start request code, ACK a text acknowledge code, CALL a retransmission request code, NAK a text invalid code or standby code, and TEXT transmission data.

Figure 1:
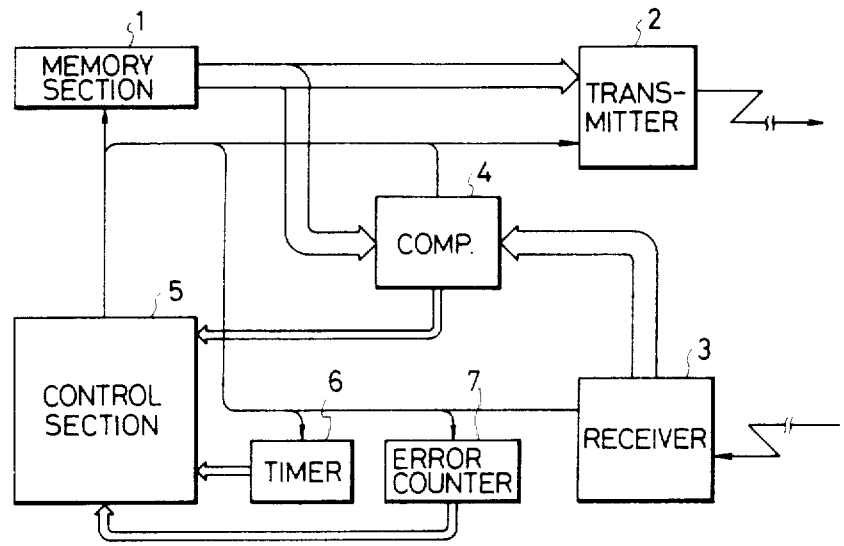
FIG. 1 is a block diagram showing the arrangement of a terminal unit on the signal transmitting side in a conventional data transmission system.
Figure 2A:
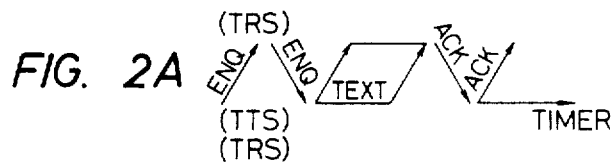
FIGS. 2A through 2C are timing charts showing signal transmission patterns in the system of FIG. 1.
Figure 2B:
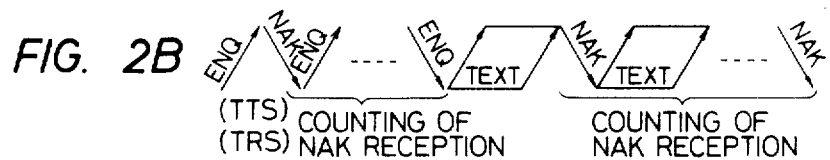
Figure 2C:
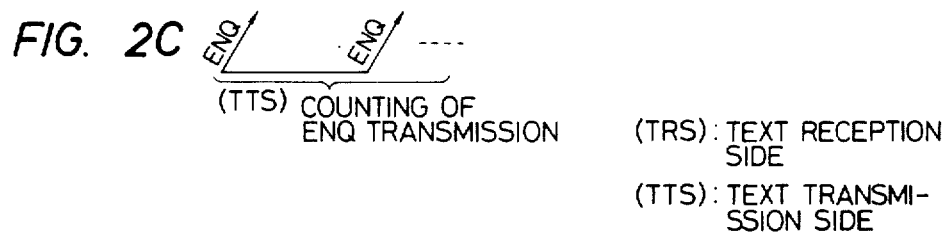
Figure 3A:
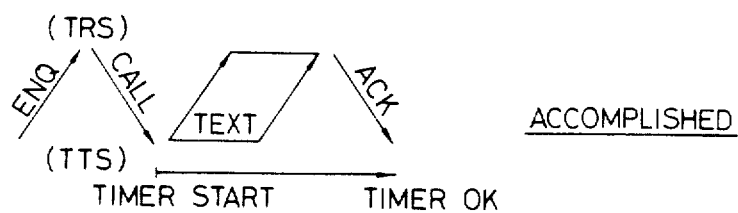
FIGS. 3A through 3E are timing charts showing signal transmission patterns according to the invention.
Figure 4:
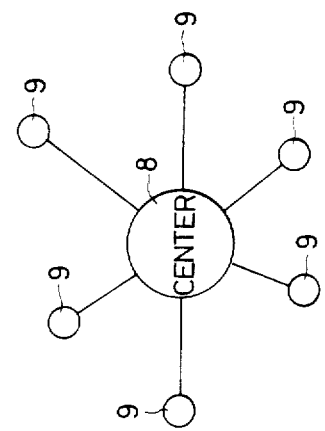
FIG. 4 is an explanatory diagram outlining a two-way CATV system to which a data transmission system according to the invention is applied.

FIG. 3A shows the fundamental data pattern. First, the terminal unit on the signal transmitting side TTS transmits a start request ENQ. If, in this case, the CPU of the signal receiving side TRS is ready for receiving signals, a text request CALL is made. On the signal transmitting side, the text is transmitted and the timer 16 is started immediately. If the acknowledgement code ACK is received within the predetermined period of time, then the transmission is accomplished.

Figure 3B:
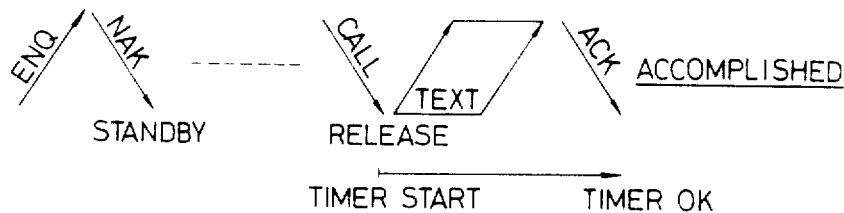

When the CPU on the signal receiving side transmits the negative acknowledgement code NAK in response to a start request, as shown in FIG. 3B, the signal transmitting side is placed in the standby state. Thereafter, in response to a retransmission request code CALL from the signal receiving side, the fundamental pattern (similar to that of FIG. 3A) is effected as shown in FIG. 3B.

Figure 3C:
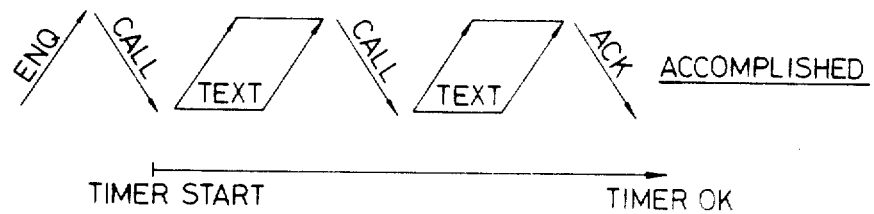
Figure 3D:
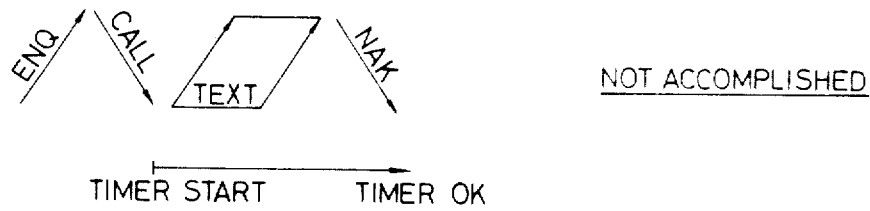
Figure 3E:
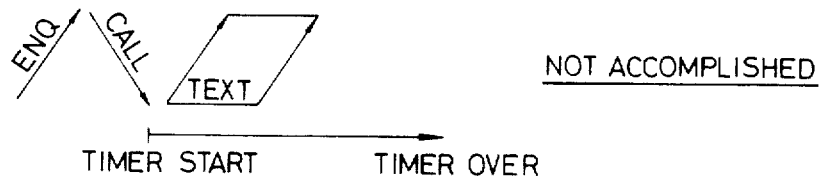

FIG. 3C shows an example of a retransmission request. In response to the code CALL, the text is transmitted. In this case, upon reception of the first code CALL, the timer 16 is started. Transmission is then accomplished if the code ACK is received within the predetermined period of time, even in the case where a retransmission request has been made. In the case of FIG. 3D, after the code CALL is received, the text is transmitted. However, in this case, the text negative acknowledgement code (NAK) is received, and transmission is not affected. In the case of FIG. 3D, after the text has been transmitted, no reply is made within the predetermined period of time, and therefore transmission is not accomplished.

FIGS. 7A through 7C show three modes in the above-described two-way CATV system in which data is transmitted from the center 8 and received by the terminal unit 9. In FIG. 7A, upon reception of the ENQ bit in the "1" state from the center, the terminal unit transmits the ACK bit as a "1" and starts the timer. Upon reception of a "1" for the ACK bit, the center 8 transmits the text. Thereafter, the center carries out an ordinary polling operation twice in succession and then receives the signal ACK (or NAK) from the terminal unit. If the parity of the received text is correct, and assuming that the time set by the timer 16 has not expired before the second ordinary polling station is received, the text is transferred to the output section 8.

If the terminal unit is busy when the signal ENQ is received from the center, the NAK bit in the "1" state is transmitted as shown in FIG. 7B. When the terminal unit becomes not busy, it receives the signal ENQ. Upon reception of the signal ENQ, the terminal unit transmits the signal ACK and starts the timer 16, as indicated in the FIG. 7A. With respect to FIG. 7C, the case where the time counted out by the timer 16 expires before the second polling signal is received is indicated. In this case, the center receives the signal NAK. Therefore, transmission is not accomplished.

FIGS. 8A through 8D show four patterns in which data is transmitted by the terminal unit 9 and received by the center 8.

When, after transmitting the ENQ bit as a "1" in response to the ordinary polling signal from the center, the terminal unit 9 receives the signal CALL from the center, the terminal unit 9 transmits the text and starts the timer 16. When the terminal unit 9 receives the signal ACK from the center 8 after transmitting the text, the terminal unit 9 causes the output section 8 to display for instance the character "GOOD" representing the fact the data has been transmitted correctly to the center. Thus, the transmission has been accomplished.

In the case where, within the time set by the timer, the text retransmission request signal CALL is received, the text is retransmitted and the signal ACK is received, then transmission is accomplished as shown in FIG. 8B. If the center is busy, no reply is made to the signal ENQ from the terminal unit. When the center becomes not busy, the signal CALL is transmitted to the terminal unit, whereupon transmission is carried out in the manner shown in FIG. 8C. In the case where, after the text has been transmitted, no reply is made within the time set by the timer 16 or the retransmission request is continuously present, transmission is not effected. This case is illustrated by FIG. 8D.

In the above-described embodiment of the invention applied to a two-way CATV system, in any case, that is, either for transmission of data from the center to the terminal unit or the transmission of data from the terminal unit to the center, the terminal unit carries out communication time control by starting the timer simultaneously with the start of data communication. Therefore, if the center one-sidedly interrupts the communication or the communication is interrupted in some other way, the terminal unit automatically suspends the communication operation.

It is necessary to establish a parity order for the signals ENQ from the center and the various terminal units so that the transmitted signals ENQ can be handled according to the priority order.

The data transmission system according to the invention is applicable not only to the case where data is transmitted from the terminal units, but also to the case where data is transmitted from the master station to the terminal unit as described above.

As described above in detail, according to the invention, the function of requesting the retransmission of data and the function of counting how many times abnormal conditions are detected is eliminated from the signal transmitting side, thereby making it possible to simplify the arrangement of the system as a whole. On the signal transmitting side, the transmission time control is carried out with a timer, and the transmission is automatically suspended when an abnormal condition, such as the CPU being nonfunctional, occurs on the signal receiving side. Accordingly, even if a large number of terminal units are provided on the signal transmitting side, no communication "panic" will occur in the system.

We claim:

1. A method for operating a data transmission system having a transmitting side and a receiving side, comprising the steps of:
   sending a start request signal from said transmitting side to said receiving side;
   deciding on said receiving side if text is to then be received;
   sending to said transmitting side from said receiving side in response to said start request signal (a) a retransmission request signal if text is then to be received, or (b) a text invalid/standby signal if text is not then to be received;
   if said text valid/standby signal is sent from said receiving side to said transmitting side, later deciding on said receiving side when text can be received;
   responsive to said later deciding, sending from said receiving side to said transmitting side a retransmission request signal;
   sending text from said transmitting side to said receiving side upon said transmitting side receiving said retransmission request signal;
   simultaneously upon commencement of the sending of said text at said transmitting side, starting a timer to count a predetermined time period;
   halting the sending of said text from said transmitting side to said receiving side if a text invalid/standby signal is received from said receiving side, said timer continuing to count out said predetermined time period irrespective of the receipt at said transmitting side of said text invalid/standby signal;
   sending from said receiving side to said transmitting side a text acknowledgement signal when valid text has been received by said receiving side; and
   invalidating at said transmitting side text sent from said transmitting side to said receiving side if said time completes counting out said predetermined time period before said text acknowledgement signal is received at said retransmitting side from said receiving side.

2. The method of claim 1, further comprising the step of, at said transmitting side, recommencing sending of text upon receiving a retransmission request signal from said receiving side.

3. The method of claim 1, wherein said timer is started upon reception of the first occurrence of a retransmission request signal from said receiving side following the sending from said transmitting side to said receiving side of a start request signal.

4. The method of claim 1, further comprising the step of, at said receiving side, checking the parity of a received text, and sending a text invalid/standby signal in the case that said parity is incorrect.

* * * * *